Dec. 31, 1957         V. L. GOEBEL         2,817,880
REFRIGERATOR DOOR AND METHOD OF ASSEMBLING THE SAME
Filed Sept. 13, 1955         5 Sheets-Sheet 1

INVENTOR.
VICTOR L. GOEBEL.
BY
ATTORNEYS.

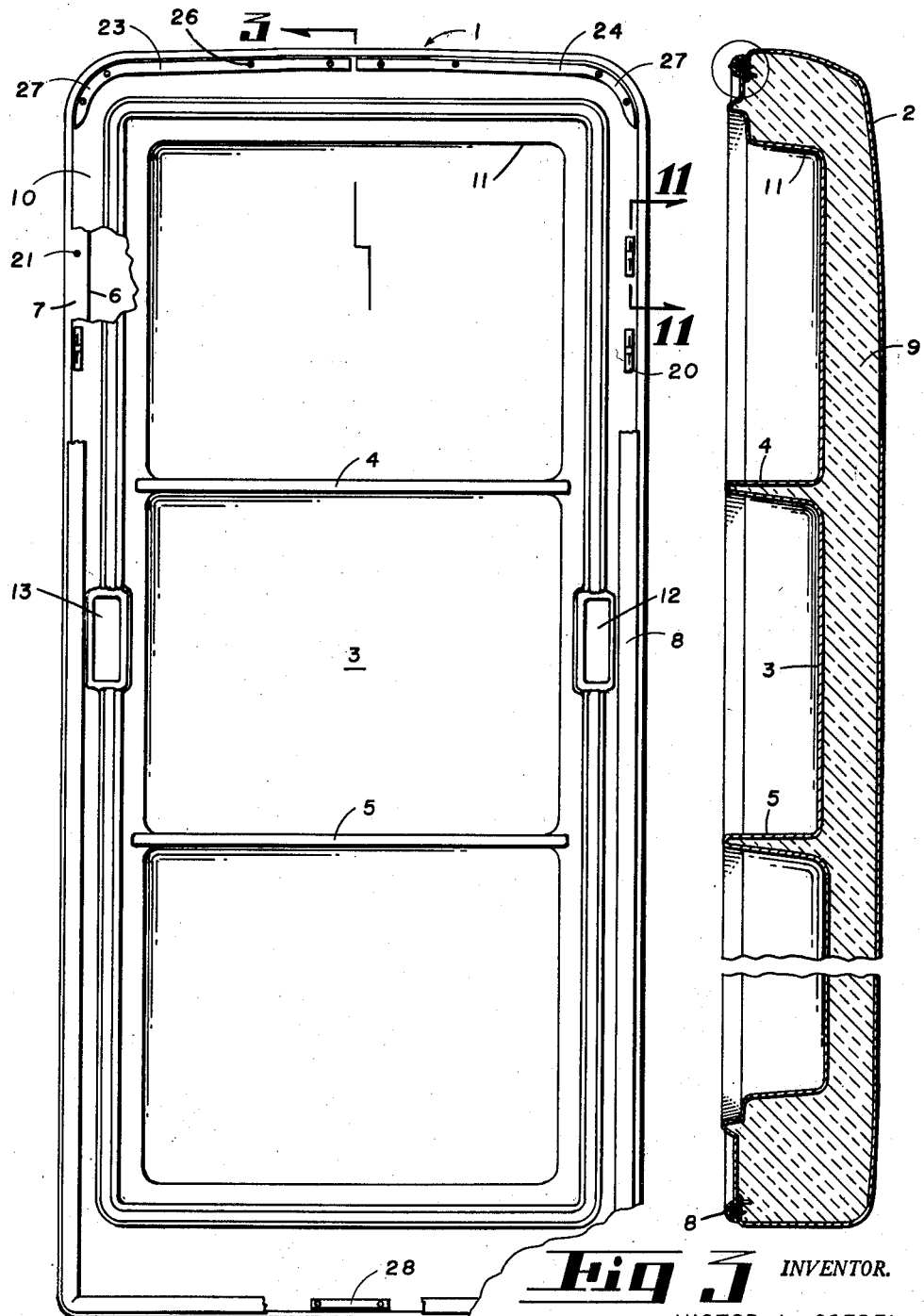

Dec. 31, 1957 V. L. GOEBEL 2,817,880
REFRIGERATOR DOOR AND METHOD OF ASSEMBLING THE SAME
Filed Sept. 13, 1955 5 Sheets-Sheet 3

INVENTOR.
VICTOR L. GOEBEL.
BY
ATTORNEYS.

Dec. 31, 1957 V. L. GOEBEL 2,817,880
REFRIGERATOR DOOR AND METHOD OF ASSEMBLING THE SAME
Filed Sept. 13, 1955 5 Sheets-Sheet 4
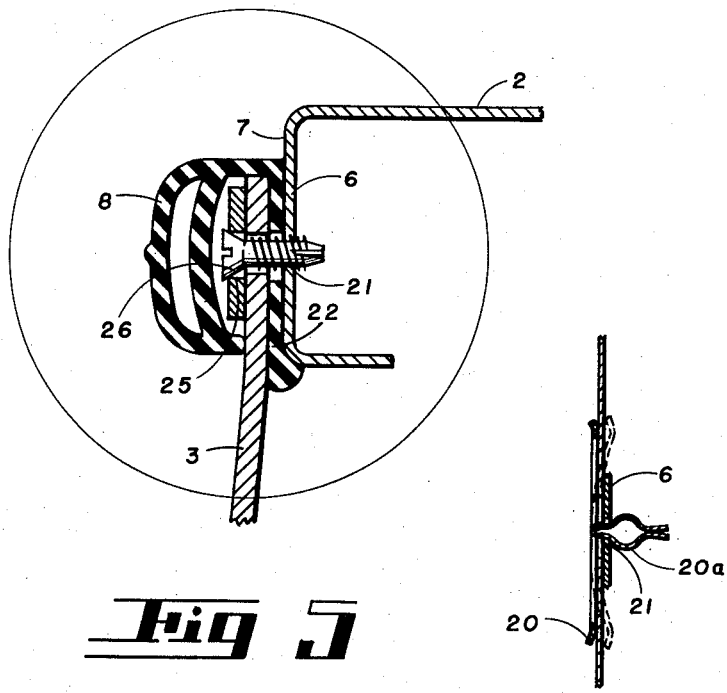
Fig 5
Fig 11
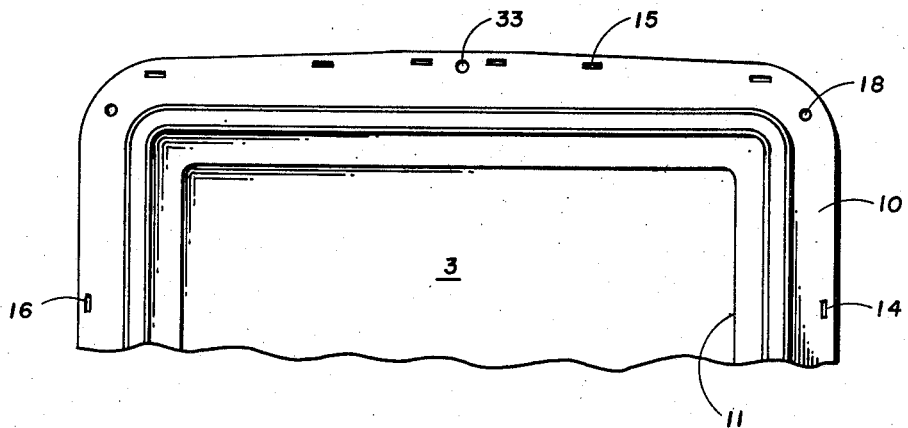
Fig 6
INVENTOR.
VICTOR L. GOEBEL.
BY
ATTORNEYS.

Dec. 31, 1957 V. L. GOEBEL 2,817,880
REFRIGERATOR DOOR AND METHOD OF ASSEMBLING THE SAME
Filed Sept. 13, 1955 5 Sheets-Sheet 5
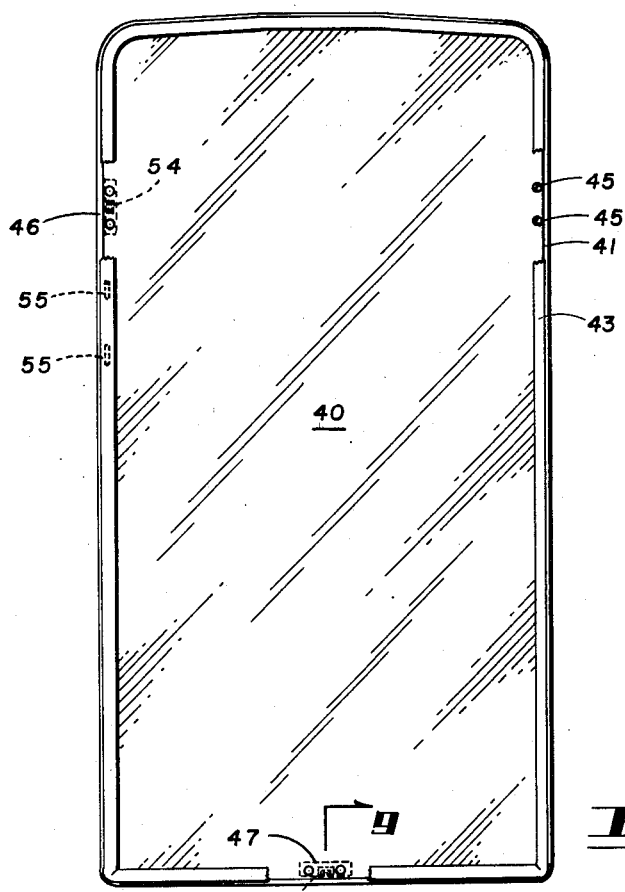
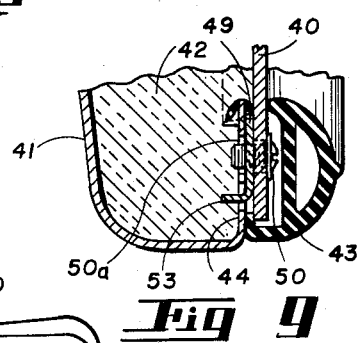
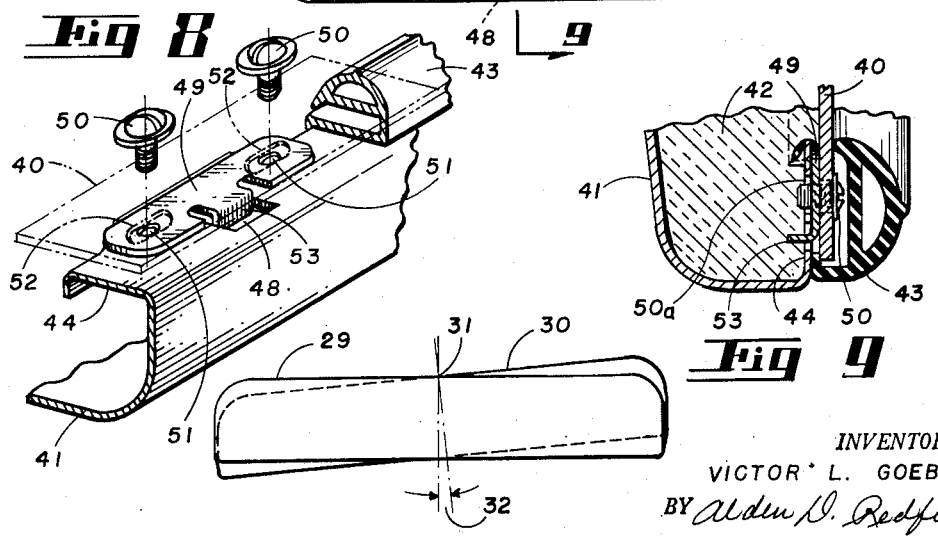
INVENTOR.
VICTOR L. GOEBEL.
BY Alden D. Redfield.
Warren Kuntz
ATTORNEYS.

United States Patent Office 2,817,880
Patented Dec. 31, 1957

2,817,880

REFRIGERATOR DOOR AND METHOD OF ASSEMBLING THE SAME

Victor L. Goebel, Cincinnati, Ohio, assignor to Avco Manufacturing Corporation, Cincinnati, Ohio, a corporation of Delaware Application September 13, 1955, Serial No. 534,077

2 Claims. (Cl. 20—35)

The present invention relates to a refrigerator and, more particularly, to an improved refrigerator door and to a method of assembling the door components. More specifically, the invention relates to a refrigerator door comprised of components made from materials having significantly different coefficients of thermal expansion.

In refrigerators of conventional design, particularly domestic refrigerators, it is commonplace to provide a main access door hingedly attached to a refrigerated storage cabinet. The access door usually comprises an exterior sheet metal shell to which is secured a plastic inner liner. The liner may include shelves and auxiliary compartments for storing small food packages and bottles. For instance, such a liner may define a plurality of horizontally extending shelves in addition to small compartments for the storage of butter, cheese, and eggs.

To simplify the construction of a liner having such storage facilities, it has been found convenient and economical to make the liner from an easily molded plastic. Recently a very economical molding process has come into use which for convenience may be termed "vacuum forming." In this process a sheet of plastic is heated to a temperature at which it is pliable. The sheet is then stretched across an open mold into which the sheet is drawn by evacuation of the mold cavity. It has been found from actual experience that the sheet will be drawn readily into the mold and assume and permanently hold the molded contours of shelves and compartment walls.

A plastic which handles well during vacuum forming is polystyrene. Desirable as it is for the manufacture of door liners, polystyrene and modified styrene molding compounds have an unusually high coefficient of thermal expansion and one which is significantly different from that of steel. The importance of this physical characteristic will be fully appreciated when it is realized that a refrigerator door assembly may be subjected to a wide range of temperatures during use and shipment. This temperature range may extend from —20° F. to 160° F. Over such an extreme temperature range, the differential expansion between the polystyrene liner and the door shell will result in severe buckling, cracking of the plastic, and distortion if the door is constructed according to conventional principles.

To alleviate these undesirable effects, it has been proposed that the liner be movably supported by the door shell. For instance, an inwardly facing open channel may be formed around the periphery of the door, and the liner may be loosely supported by the channel. This permits the liner to expand at will without buckling or cracking. A natural consequence of such a design, however, is that the liner cannot be relied upon as a strength member in the door assembly; in such designs the door must be internally braced.

With reference to bracing, another factor must be considered. It is important that a refrigerator door seal tightly with its cabinet. During assembly, the door is normally adjusted so that in a closed position the cabinet large expanse of sheet metal, frequently is warped and is airtight. The door shell, consisting of a relatively it is necessary to apply forces to it to establish the desired configuration. Planarity is the condition usually desired, although occasionally it is actually necessary to impart a predetermined twist to the door to make it conform to a cabinet having sealing surfaces which are not planar.

In a door having a floating liner, i. e., a liner loosely supported by inwardly facing channels, internal bracing must be relied upon to hold the door in the proper shape. Such braces are objectionable from the standpoint of cost and complexity and cannot be successfully employed when the liner is deeply recessed for door shelves. In such event the liner interferes with the braces.

For these reasons, the liner is desirably used as a strength member to avoid the need for internal bracing. Such use of the liner, however, usually necessitates positive attachment of the liner to the door shell. As a result, the relatively large coefficient of thermal expansion of certain plastics is highly objectionable since the liner buckles and frequently cracks because of the large stresses generated by differential expansion between points where the liner is fastened to the shell.

By means of the present invention it is possible to use a vacuum formed liner of high coefficient of expansion as a strength member. The novel structure is such that differential expansions of liner and door shell are in no way harmful, and during assembly the liner may be assembled to the door in a novel manner which establishes the desired shape of the door assembly, which shape will be maintained during use of the refrigerator.

Briefly stated, the invention broadly comprises fixedly securing the liner to the door shell at only one point, or, at most, in a limited area, and at other points restraining movement of the liner relative to the shell in such fashion that differential thermal expansions are accommodated but stresses can be imposed on the shell to hold it in the desired shape for sealing with the cabinet. Various embodiments of the invention are disclosed. In one embodiment the liner is frictionally restrained from movement under normal loading, such as resulting from food storage, but is free to move as a result of thermal expansions. The frictional restraint is so arranged as not to unduly stress the liner or permit cracking or buckling. In another modification total restraint is provided at one point between liner and shell, other restraints being partial and each permitting relative movement in only one direction. In another modification of the invention, the principles of both of the foregoing modifications are combined.

The invention encompasses not only a novel door but also the novel method by which it is assembled.

From the foregoing, it will be readily appreciated that an important and broad object of the present invention is the provision of an improved refrigerator door.

More specifically, it is an object of the invention to provide means for mounting a door liner in such fashion that differential thermal expansions do not harm the liner or distort the door assembly.

The following objects also characterize the invention:

a. Provision of a refrigerator door in which the liner constitutes a strength member.

b. Provision of a refrigerator door in which the liner may be relied upon to impart a predetermined configuration to the door assembly.

c. Provision of a refrigerator door structure which permits wide design flexibility in the arrangement and construction of integrally molded food supports.

d. Provision of a refrigerator door which may be economically constructed and easily assembled.

A further object of the invention is to provide an improved liner mounting means which does not impair the appearance of the door.

It is also an object of the invention to provide a method of assembling an expansible liner to a door shell in such a way that a predetermined configuration may be imparted to the assembled door.

Novel features that I consider characteristic of my invention are set forth in the appended claims; the invention itself, however, both as to its organization and method of operation, together with additional objects and advantages thereof, will best be understood from the following description of specific embodiments when read in conjunction with the accompanying drawings, in which:

Figure 2 is a front elevational view of a refrigerator door illustrating the preferred embodiment of this invention;

Figure 3 is a vertical sectional view of the door assembly taken on plane 3—3 of Figure 2;

Figure 5 is a cross sectional view through an edge of the liner, being an enlarged view of the circled upper portion of Figure 3;

Figure 6 is a fragmentary front elevational view of the upper portion of a door liner embodying a modification of the invention;

Figure 7 is a front elevational view drawn to a smaller scale showing a door assembly embodying another modified form of the invention;

Figure 8 is a perspective view of an adjustable bracket employed in the door assembly shown in Figure 7;

Figure 9 is a cross sectional view of the modified door assembly taken on plane 9—9 of Figure 7;

Figure 10 is a diagrammatic illustration of a twisted door shell; and

Figure 11 is a cross sectional view taken on plane 11—11 of Figure 2 showing a spring clip for holding the liner against the shell.

Figure 1:
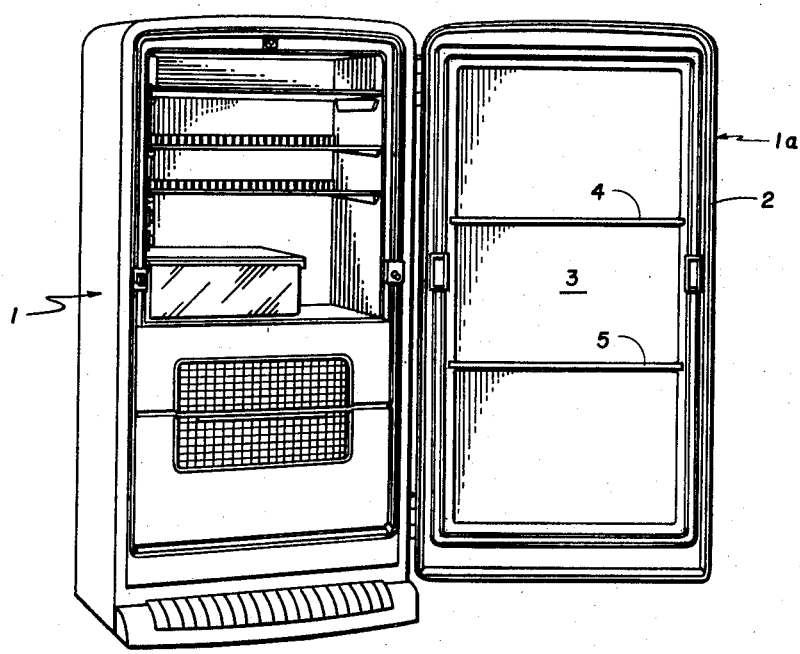
Figure 1 is a perspective view of an open refrigerator having an access door embodying this invention.

Before consideration is given to the method of the present invention, attention is first directed to Figure 1 which shows a refrigerator cabinet, generally designated 1, having an access door, generally designated 1a. The door comprises outer shell 2, which may be made from sheet metal, and an inner liner 3 which may be made from plastic. As will be understood from the foregoing comments, liner 3 preferably is vacuum formed from polystyrene. The liner includes integrally formed, horizontally extending shelves 4 and 5. Relatively simple shelves have been shown in the drawings although it should be understood that they may be more complicated to meet particular food storage requirements.

Turning attention to Figures 2 and 3, door shell 2 includes an inturned peripheral flange 6 defining a planar surface 7 to which the liner is attached, as will be explained. Clamped between the liner and the flange is a resilient gasket 8 which is held in airtight sealing engagement with the front face of a refrigerator cabinet when the door is closed.

Thermal insulation 9 fills the space defined between the shell and liner, as illustrated in Figure 3.

Figure 4:
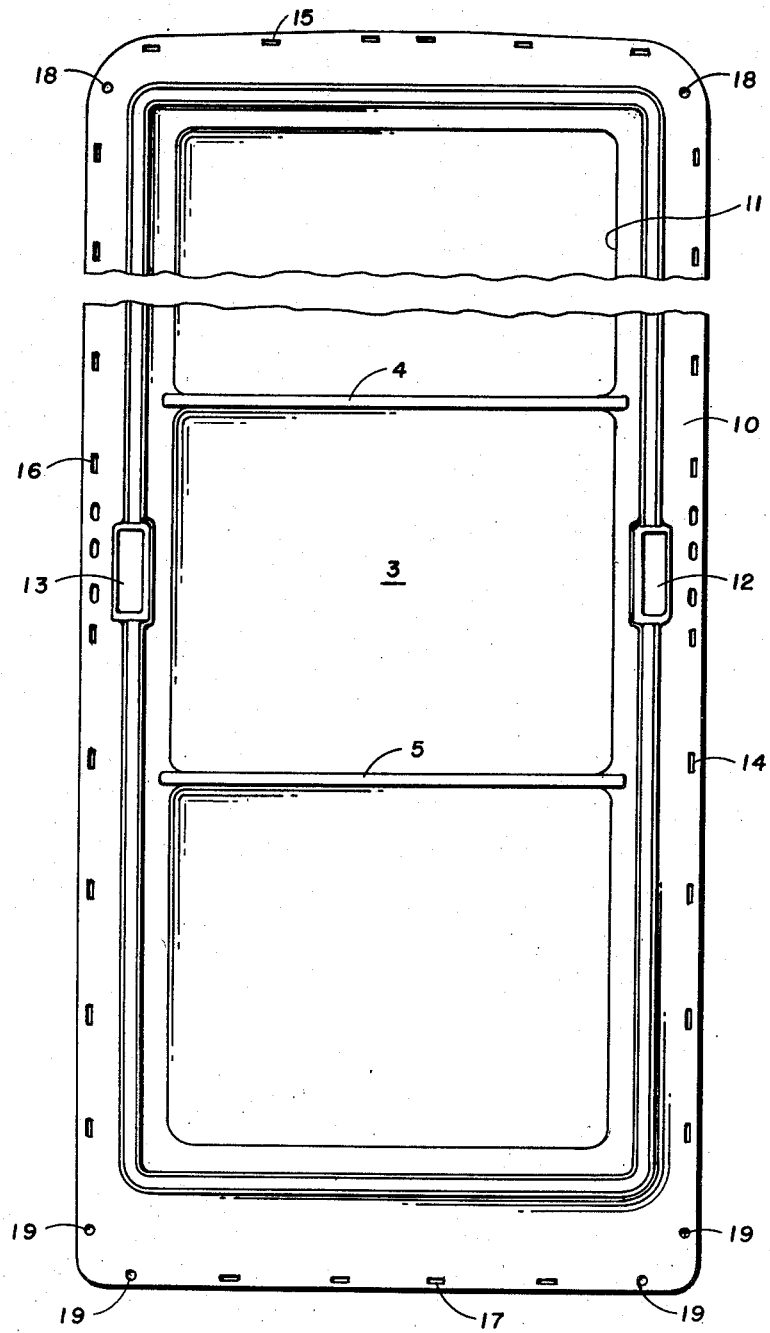
Figure 4 is a front elevational view of the liner removed from the door assembly shown in Figure 2.

Attention should now be directed to Fig. 4 showing the liner removed from the door assembly. It will be observed that the liner includes a marginal flange 10 which is positioned adjacent surface 7, as has been explained in connection with Figure 2. The marginal flange surrounds a central recess 11 which is divided into food storage spaces by the beforementioned shelves 4 and 5. A rectangular opening may be formed at either 12 or 13 to accommodate a latch mechanism, as will be understood by those skilled in the art. Two rectangular areas are provided for forming such an opening since the same liner is used on refrigerators having right-hand and left-hand doors.

Attention is called to the formation of a plurality of elongated slots 14, 15, 16, and 17 in the marginal flange of the liner. Slots 14 and 16 are vertically oriented while slots 15 and 17 are horizontally arranged. In addition to these slots, circular holes 18 and 19 are provided at the top and bottom of the liner, respectively.

Figures 2 and 4 should now be compared. It will be noted that slots 14 and 16 are clearance slots permitting passage of portions 20a of spring clips 20 through the liner into removable engagement with holes 21 formed in flange 6 of the shell. (See Figure 11.) Since the slots are considerably longer than the diameter of portions 20a, movement of the liner relative to the shell parallel to the length of the slots is possible with very little restraint. The main purpose of the clips is to hold the marginal flange of the liner snugly against flange 22 of gasket 8 which, in turn, is held snugly against flange 6 of the shell. In Figure 11 clip 20 is shown in its free state by dashed lines and in its deflected state by full lines. Deflection of the clip generates forces for holding the liner against gasket flange 22. The compressive force of clips 20 is not large enough to impede relative movement between liner and shell resulting from differential thermal expansion.

In addition to the spring clips, hold-down bars 23 and 24 are provided at the top of the liner. See Figure 2. These bars may be made from steel or other relatively rigid material and define a plurality of circular holes 25 through which self-tapping screws 26 are passed. The screws are threadedly engaged in holes 21 of the shell along the top peripheral edge of the door. Screws 26 have tappered heads (see Figure 4) which aid in locating bars 23 and 24 as the screws are tightened into the flange of the shell.

It should be noted that bars 23 and 24 preferably, although not necessarily, extend around the corners of the door assembly, as indicated at 27. The purpose for arranging the bars in this fashion is to assure that the corners of the liner will conform closely to the corners of the shell, holding the gasket 8 securely and uniformly in place.

A short hold-down bar 28 is secured by two screws at the bottom center of the door assembly. See Figure 2. The screws holding this bar against the liner pass through the two central slots 17 of the liner.

The hold-down bars, when securely screwed against the liner, prevent buckling of the liner between the screws as a result of differential expansions. The screws may be tightened by a screw driver in a normal manner but will not totally restrain all movement of the liner relative to the shell because the resilience of gasket flange 22 prevents sufficient tightening of the bars to afford total restraint. The degree of restraint afforded by the bars, however, is sufficient to hold the liner and shell in preferred assembled positions. More will be said about this shortly.

Returning to a study and comparison of Figures 2 and 4, it will be noted that by virtue of slots 15 and 17 and the partial restraint of bars 23 and 24, horizontal movement of the marginal flange of the liner relative to the shell is possible at the top of the door assembly. Horizontal relative movement of the marginal flange at the bottom of the door assembly is also possible.

Vertical expansion of the liner constitutes no problem because the shelf formations 4 and 5 create inherent flexibility accommodating thermal expansion without damage to the liner. The vertical marginal flanges of the liner, however, do not have the benefit of this flexibility. For this reason, slots 14 and 16 are arranged vertically and permit vertical relative movement between liner and shell. Since these elongated slots provide clearance around the clips and the clips clamp the liner with only moderate force, no objectionable stresses result and no problem of buckling or cracking of the liner is present.

Thus, hold-down bars are not provided along the vertical margins.

Since both horizontal and vertical movement of the marginal flanges of the liner is to be expected, special oversize clearance holes are provided at 18 and 19, as has been explained in connection with Figure 4. These holes are circular and accommodate movement of the liner relative to the shell in all directions.

During assembly of the door, the liner, shell, insulation and gasket are all assembled as illustrated, and clips 20 are installed to hold the assembly together. Bars 23, 24, and 28 are then screwed into position until slight restraint is imposed on the liner. The door assembly is then compared to the cabinet with which it will be used and any mismatching of mating surfaces is noted. The shell is then twisted as may be required to bring the door into close conformity with the cabinet. During this twisting operation the bars permit relative shifting movement of the liner and shell. The degree of restraint is sufficient, however, to hold any degree of twist or adjustment which is imposed on the shell. Thereafter, the screws 26 are fully tightened and the assembly operation is complete.

During use, the door assembly will maintain its predetermined configuration. However, differential expansion of the liner and shell is possible. Movement of the liner is even possible between adjacent screws 26 since the bars resiliently mounted by virtue of flange 22, cannot develop sufficient restraint to oppose the sizable stresses which are generated thermally.

The differential expansions may be quite sizable. A refrigerator door may be subjected to temperatures from —20° F. to 160° F. in the course of shipment and during normal use. Over such a temperature range, a door, the liner of which may be fifty or more inches in length, will experience differential expansions of a quarter of an inch or more. This will be fully understood when it is realized that the coefficient of thermal expansion of steel is $.63 \times 10^{-5}$ per degree Fahrenheit while that of polystyrene and modified styrene molding compounds varies from 1.9 to $11.7 \times 10^{-5}$ per degree Fahrenheit. Thus, polystyrene expands from three to eighteen times as much as steel over a given temperature range.

When the door has been assembled, as described, the liner acts as a strength member, imparting rigidly to the door and holding the assembled door in the desired shape conforming to the cabinet. The ability of the liner to hold the shell in the desired shape may be more easily understood by reference to Figure 10 which diagrammatically shows a twisted shell in exaggerated form. Shown in full lines at 29 is the top horizontal contour of the shell while the bottom contour is shown partially in full lines and partially in dash lines at 30. Because of the formation of the shell, the twist usually tends to occur about a vertical axis, indicated at 31, resulting in displacement 32 of the top and bottom midpoints on the inner flange of the shell. Obviously, the twist can be removed from the door if the upper and lower midpoints are swung through an arc comparable to 32 by lateral forces. Such forces can be applied through the provision of bars 23, 24, and 28 illustrated in Figure 2. When firmly screwed to the liner, these bars generate significant friction forces to effect straightening of the twisted shell.

As a modification of the present invention, the liner may include a top central pilot hole 33 shown in Figure 6. When such a modified liner is assembled to a shell, a close fitting screw may be passed through hole 33 and into the shell assuring that the top vertical center line of the liner remains centralized on the shell regardless of any movement imparted thereto during assembly or as a result of thermal expansions. In such a modified arrangement, the remainder of the assembly would be as illustrated in Figure 2.

A further modification of the invention is illustrated in Figures 7 through 9. This modification is particularly desirable when a relatively flat liner 40 is secured to a shell 41. Such a liner, not having flexibility such as integral shelves provide, is relatively rigid and cannot absorb vertical differential expansions as can the liner illustrated in Figure 4.

As in the former door assembly, the liner and shell confine a mass of thermal insulation 42. The liner 40, as illustrated in Figure 9, clamps gasket 43 snugly against flange 44 of the shell.

The manner of attaching the liner to the shell may now be considered. With reference to Figure 7 two screws are shown at 45 which are tightly screwed into shell flange 44 thereby determining a region of relatively fixed attachment of liner to shell. Two other points of partial restraint are also provided. One is located at 46 opposite screws 45; the other is located at 47 at the bottom center of the door.

Attention should now be directed to Figure 8 which is a perspective showing of attachment 47. It will be noted that a rectangular opening 48 is formed in the shell flange 44 at the bottom of the shell. Shown in phantom lines is the bottom edge of the liner 40 in engagement with gasket 43. A portion of the gasket is cut away, as indicated in Figure 9, to accommodate a bracket 49 which is held against the backside of the liner 40 by a pair of washer-head screws 50.

The screws are threadedly engaged in holes 51 of bracket 49. It is important to note that the liner defines a pair of elongated slots 52 permitting lateral movement of the liner relative to the bracket 49. Screws 50 pass through clearance holes 50a in the flange of the shell.

An inturned tab 53 is integrally formed with bracket 49. This tab engages the lateral edges of rectangular opening 48.

Essentially the same structure is provided at point 46. Here, however, the inturned tab engages the upper and lower edges of a rectangular opening 54 provided in a side flange of the liner shell.

Thus, tab 53, by engagement with opening 48, permits vertical movement of the liner relative to the shell while restraining lateral movement thereof. In contrast, the tab engaged with rectangular opening 54 permits horizontal movement of liner relative to shell while restraining vertical movement.

In addition to the attachments of liner to shell, which have been already described, there is also provided a plurality of spring clips 55 similar to those described with reference to Figures 2 and 11.

During assembly of the door, shown in Figure 7, the spring clips are assembled with shell, liner, gasket, and insulation to hold the parts together. Screws 45 are then firmly tightened. The screws, such as 50, are then snugly but not firmly screwed into their brackets (such as shown at 49) to position them against the liner. At this point the shell may be adjusted, such as by being twisted through arc 32 of Figure 10. During such adjustment, the brackets can be shifted relative to the liner, the shifting movement being accommodated by the slots 52. The degree of restraint afforded by the partially tightened screws 50 permits the adjustment but holds the liner and shell in the adjusted positions until such time as the screws are finally and firmly tightened.

At this point, the assembled door has the desired configuration and the liner and gasket are snugly secured against the shell. Here again, however, vertical movement of the liner relative to the shell is possible without buckling or damage to the liner. This results from the resilient nature of the clips 55 and the vertical movement accommodated by tab 53 in opening 48, as has been explained. Horizontal movement of the tab in opening 54 accommodates horizontal expansions. Movements of the liner occur towards and away from screws 45 which constitute substantially fixed reference points.

Screws 45 are sufficiently remote from attachment 47 that the horizontal expansions occurring over this vertical expanse of liner are easily accommodated and do not result in objectionable distortion or structural failure.

Obviously, various features of the different modifications can be combined as desired. For instance, attachment of the type shown at 47 in Figure 7 can be used in place of bar 28 in combination wtih bars 23 and 24 of Figure 2. Also, restraints 45 and 46 may be used in conjunction with a bar such as 28 at the bottom of the door where a relatively flexible liner is employed. It is also possible to combine a liner of the type shown in Figure 6 with either bar 28 or with restraint 47 as shown in Figures 7 and 8.

All of the modifications illustrated are arranged so as not to impair the appearance of the door in any way. All fasteners are hidden beneath the gasket of the finally assembled door.

Adjustments can easily be made and, once made, will be permanently maintained regardless of door loading or expansions during shipment and use.

All of the designs are characterized by sufficient load carrying capacity so that relatively large food storage loads imposed on the liner can be transferred through a plurality of attachments such as screws 26 in Figure 2 or screws 45 and the tab engaged with opening 54 in Figure 7.

It will be apparent to those skilled in the art that the present invention not only provides an improved door structure but also an improved method of assembling the door components whereby a predetermined shape can be imparted to the door and held during use of the door without impeding the significant thermal expansions which are necessarily and unavoidably present.

Having described a preferred embodiment of my invention, I claim:

1. In combination, a refrigerator door shell having an inturned flange, a liner having a peripheral edge overlying said flange, a resilient gasket surrounding the edge of said liner and having a portion extending between said liner and said flange, a hold-down bar at the top of said liner adjacent its outer face, a hold-down bar at the bottom of said liner adjacent its outer face, screws passing through said hold-down bars and said liner, said screws being threadedly engaged with said flange and fastening said bars securely against said liner, said screws passing with clearance through said liner, said bars being disposed beneath said gasket so as to be invisible under normal conditions of use, and spring clips beneath said gasket disposed at intervals along the edge of said liner between said bars for resiliently clamping said liner against said gasket and said flange.

2. In combination, a refrigerator door shell having an inturned flange; a door liner overlying said flange; a gasket surrounding the periphery of said liner and extending in part between said liner and said flange; hold-down bars at the top and bottom of said liner adjacent its outer face; fasteners extending through said hold-down bars, said liner, and said flange for clamping said liner to said shell; said fasteners passing with clearance through said liner; and a plurality of spring clips adjacent the peripheral edge of said liner for resiliently clamping it to said flange between said hold-down bars, said gasket covering said clips and hold-down bars to render them invisible during normal use.

References Cited in the file of this patent
UNITED STATES PATENTS

| | | |
|---|---|---|
| 2,296,024 | Drake | Sept. 15, 1942 |
| 2,336,644 | Scullen | Dec. 14, 1943 |